Patented Feb. 18, 1947

2,416,190

UNITED STATES PATENT OFFICE 2,416,190

CORNED MEAT

Harry H. McKee, Chicago, Ill., assignor to Industrial Patents Corporation, Chicago, Ill., a corporation of Delaware No Drawing. Application June 18, 1943, Serial No. 491,387

4 Claims. (Cl. 99—159)

This invention relates to an improved corned meat product and the method of preparing the same.

Corned beef is conventionally prepared from either the brisket or the rump by a curing process which involves submerging the meat in the curing pickle for a period of at least 3 weeks, during which time the meat is cured and the color fixed. After treatment in the pickling bath the meat is removed and may be partially or entirely cooked to form a product suitable for canning or for other purposes. An alternative method has in some cases been employed by which the fresh meat is cubed and initially cooked in a water bath followed by treatment with dry curing materials for an extended period of time. The product formed in either case is found to have a substantially bland or flat taste resulting from the loss of natural juices to the aqueous treating solution. The food value is likewise considerably impaired due to the loss of proteins and vitamins contained in the juices which is indicated by the fact that the product has lost from 2 per cent to 3 per cent solids content in the processing. Furthermore, in such prior methods excessive time periods are required in order to accomplish the curing process so that the meat is adequately preserved, resulting in the curtailment of the operating capacity of a given plant and considerably increasing operating costs. Also, refrigeration expenses involved in the aforesaid second method wherein the dry salt method of curing is used constitute a considerable item and materially add to the cost of the product. A further method which has been proposed heretofore is to simultaneously cure and to cook the beef in a brine bath for a period of about 36 hours. The latter procedure likewise resulted in the loss of water soluble proteins and vitamins and the resulting product was found to have a bland flavor and lack the natural full flavor of the beef.

The present invention contemplates subjecting the meat in the substantial absence of extraneous liquids to temperatures relatively low but high enough to produce sufficient cooking to release the natural juices and coagulate the proteins, adding an active curing agent either initially or during the processing so as to be dissolved in the juices and cooking the product for a sufficient period to absorb the solids content of the juices including proteins and vitamins into the product with the active curing agents. The active curing agent is incorporated during the processing after sufficient juices are released to effect solution or, if desired, may be added at any point in the process by dissolving in a small quantity of water. The absorption of the concentrated natural juices is found to impregnate the interior cell structure with the active agent to accelerate the curing process and simultaneously restore the natural constituents of the juices including the proteins, vitamins, and flavoring materials to the meat. The reconstituted and cured product if desired is further processed by sterilization in hermetically sealed containers or, for example, by dehydration to form a dried product.

In practicing the invention the desired cut of beef is sliced into 2 inch cubes and charged to a suitable steam jacketed cooker. A preferred cooker is ordinarily of sufficient size to hold about 1000 to 1500 pounds of meat and is steam jacketed to carry about 3 to 10 pounds of pressure. After the raw meat is placed in the cooker, it is cooked at a temperature from about 160° F. to 200° F., inside meat temperature, for 20 to 30 minutes at about 10 pounds of steam pressure which produces a temperature of about 240° F. on the inner wall of the kettle. By this time considerable juices are released from the meat and the curing agents are incorporated into the charge in the proportion of about 2 to 5 parts of curing agent to 100 parts of meat. A preferred curing agent for the purpose of the invention consists in a mixture of 3 pounds of sodium chloride, ¾ of an ounce sodium nitrate and ¼ of an ounce sodium nitrite to each 100 pounds of meat being processed. Obviously the exact quantity of curing agent employed may be widely varied by one skilled in the art depending upon the degree of curing desired. In some cases a small quantity of water, e. g. about 4 ounces to 1500 pounds of meat, may be employed to dissolve the sodium nitrate and sodium nitrite. Following incorporation of the curing agents, steam pressure is reduced from about 3 to 5 pounds which produces a temperature of about 220° F. to 228° F. on the inner wall of the kettle and the cooking continued for a total period of from 45 minutes to 1½ hours. The meat is agitated during the entire cooking operation by a slow moving stirrer or agitator, preferably mechanically driven and located on a shaft in the center of the cooker. The precooking operation may be carried out at temperatures of from about 160° F. to 200° F. although it is preferred to maintain the temperature within the range of from about 170° F. to 180° F. In most cases it has been found that the process is completed in from 45 minutes to 1½ hours, but the reaction period will be determined by the time required to effect the substantial elimination of liquids from the kettle by evaporation of moisture and absorption of the concentrated natural juices and curing agents into the body of the meat.

During the initial stage of the process a large percentage of the natural juices of the meat are released under the higher steam pressure. At this point the meat is substantially submerged in the juices, which serve as a cooking medium, thus permitting the meats to withstand higher temperatures than otherwise without impairing the natural flavor and vitamin content. It has been found that by cooking the meat in the juices the necessity of adding moisture or water is eliminated thereby facilitating re-absorption of the released juices with dissolved curing agents to produce a product having a much brighter, more vivid color of greatly enhanced food value since proteins and vitamins are retained within the meat. As the moisture is evaporated and re-absorbed on continued cooking, the steam pressure is reduced so that the internal meat temperature at the end of the cooking process is not over about 165° F. to 170° F. After re-absorption of the concentrated juices into the product it has been found that the moisture content is reduced by only 20 per cent to 35 per cent, as distinguished from the conventionally cured product which exhibits a shrinkage of at least 40 per cent. The curing agents may be first dissolved in a small quantity of water and then incorporated into the product while processing. It is contemplated that some additional water may be added during the process, however, this prolongs the pre-cooking period and it is preferred that curing be accomplished solely in the presence of the natural meat juices.

The invention will be more fully understood by the following specific examples which are given by way of illustration.

Example 1

A 1500 pound batch of fresh beef is reduced into 2 inch cubes and then charged to a steam jacketed kettle and precooked with agitation for a period of about 30 minutes at a temperature of 170° F. to release a portion of the natural meat juices. About 45 pounds of a curing agent consisting of a mixture of sodium chloride, sodium nitrate and sodium nitrite is then dissolved in the released juices and the cooking continued for an additional period of 30 minutes with constant agitation. At the end of this period the concentrated juices including the curing agents were discovered to be absorbed entirely into the partially cooked meat. The product was then removed from the kettle, cut into smaller pieces and immediately stuffed into 6 pound metal containers. It is desired that an inside meat temperature of at least 135° F. be retained throughout the canning procedure. The containers were then hermetically sealed under vacuum and pressure cooked at a temperature of 240° F. for three hours and twenty minutes. The fully cooked product resulting from this treatment was found to have a remarkably bright color and a strongly beef flavor distinguished from the bland flavor of ordinary corned beef.

Example 2

A 1500 pound batch of beef was prepared by slicing into 2 inch cubes and then charged into a kettle and precooked with agitation at a temperature of 180° F. for a period of 20 minutes, following which about 30 pounds of curing agent consisting of a mixture of sodium chloride and sodium nitrate was dissolved in the released juices. The cooking process was then continued with constant agitation for an additional period of 25 minutes whereupon the product was removed from the kettle, macerated and stuffed into cans while retaining an inside temperature of 135° F. which were hermetically sealed under a vacuum. The canned product was further processed at 240° F. under pressure for a period of 3 hours.

Although the invention has been described with specific reference to corned beef, it has been found applicable to other meat products generally such as, for example, corned pork, and corned mutton.

An outstanding advantage is realized by the present invention in the production of a completely cured product in an extremely short time period where it has previously required several weeks. The product resulting from the treatment is sharply distinguished from the conventional product in that the curing agent is carried into the interior of the meat by the re-absorption of the juices accomplishing a uniform cure throughout the body. Furthermore, in the conventional corning of beef, water soluble vitamins and proteins are almost entirely lost in the pickling bath resulting in a solids loss of at least 2 per cent, whereas in the present process these valuable materials are retained in the cell structure of the meat product which is demonstrated by an unchanged solids content. The difference in the product is likewise evidenced in the materially brighter color than ordinary corned beef and a distinctive flavor resulting from conservation of flavoring constituents, which are usually lost in the pickling bath, within the meat.

Obviously, many modifications and variations of the invention hereinbefore set forth may be made without departing from the spirit and scope thereof, and therefore only such limitations should be imposed as are indicated in the appended claims.

I claim:

1. The process of preparing corned meat which comprises precooking the meat in the substantial absence of extraneous liquids until natural juices are released therefrom, said precooking being performed at a temperature of from about 160° F. to 200° F. at atmospheric pressure and for a time period of from about 20 to 30 minutes, dissolving an active curing agent into the released juices and further cooking the product while maintaining the cooking temperature of the product at from about 135° F. to 170° F. and causing free evaporation of moisture for a period of time of from about 15 to 70 minutes to concentrate and substantially absorb the free juices and curing agent into the meat.

2. The process of preparing corned beef which comprises precooking the beef in the substantial absence of extraneous liquids until natural juices are released therefrom, said precooking being performed at a temperature of from about 160° F. to 200° F. at atmospheric pressure and for a time period of from about 20 to 30 minutes, dissolving an active curing agent in the released juices and further cooking the product while maintaining the cooking temperature of the product at from about 135° F. to 170° F. and causing free evaporation of moisture for a period of time of from about 15 to 70 minutes to concentrate and substantially absorb the free juices and curing agent into the meat.

3. In the process of preparing a cooked corned meat product, the steps which comprise precooking the meat in the substantial absence of extraneous liquids at an inside meat temperature of from about 160° F. to 200° F. until natural juices are released therefrom, dissolving sodium chloride, sodium nitrate and sodium nitrite in the released juices and further cooking the product for a period of time of from about 15 to 70 minutes to substantially absorb the free juices and said dissolved materials into the meat.

4. In the process of preparing a cooked corned beef product, the steps which comprise precooking the beef in the substantial absence of extraneous liquids at an inside meat temperature of from about 160° F. to 200° F. until natural juices are released therefrom, dissolving sodium chloride, sodium nitrate and sodium nitrite in the released juices and further cooking the product for a period of time of from about 15 to 70 minutes to substantially absorb the free juices and said dissolved materials into the meat.

HARRY H. McKEE.

REFERENCES CITED

The following references are of record in the file of this patent:

UNITED STATES PATENTS

| Number | Name | Date |
| --- | --- | --- |
| 213,029 | Ashcroft | Mar. 11, 1879 |
| 175,483 | Mege | Mar. 28, 1876 |
| 1,212,614 | Doran | Jan. 16, 1917 |
| 1,435,057 | Epping | Nov. 7, 1922 |
| 1,635,302 | Alsberg | July 12, 1927 |

OTHER REFERENCES

"The Packers' Encyclopedia" by P. I. Aldrich, published by the National Provisioner 1922, Chicago, Ill., pages 166, 167. (Copy in Div. 63.)